(12) United States Patent
Bostwick et al.

(10) Patent No.: US 10,989,076 B2
(45) Date of Patent: Apr. 27, 2021

(54) TURBO HOUSING ELEMENT

(71) Applicant: Pridgeon & Clay, Inc., Grand Rapids, MI (US)

(72) Inventors: Daniel J. Bostwick, Grandville, MI (US); Waigan W. Liu, Kentwood, MI (US); Pete R. Wojtas, Grand Rapids, MI (US)

(73) Assignee: Pridgeon & Clay, Inc., Grand Rapids, MI (US)

( * ) Notice: Subject to any disclaimer, the term of this patent is extended or adjusted under 35 U.S.C. 154(b) by 140 days.

(21) Appl. No.: 16/269,917

(22) Filed: Feb. 7, 2019

(65) Prior Publication Data

US 2019/0249573 A1  Aug. 15, 2019

Related U.S. Application Data

(60) Provisional application No. 62/630,205, filed on Feb. 13, 2018.

(51) Int. Cl.
| | |
|---|---|
| *F01D 25/30* | (2006.01) |
| *F01D 25/24* | (2006.01) |
| *F01N 13/18* | (2010.01) |
| *F01N 13/10* | (2010.01) |
| *F16L 27/053* | (2006.01) |

(52) U.S. Cl.
CPC ........... *F01D 25/30* (2013.01); *F01D 25/243* (2013.01); *F01N 13/10* (2013.01); *F01N 13/1805* (2013.01); *F01N 13/1844* (2013.01); *F01N 13/1872* (2013.01); *F01N 13/1877* (2013.01); *F16L 27/053* (2013.01); *F01N 2450/24* (2013.01); *F01N 2470/20* (2013.01); *F05D 2220/40* (2013.01); *F05D 2250/52* (2013.01)

(58) Field of Classification Search
CPC ........ F01D 25/30; F01D 25/243; F01N 13/10; F01N 13/1844
See application file for complete search history.

(56) References Cited

U.S. PATENT DOCUMENTS 4,730,852 A * 3/1988 Arscott .................. F01N 13/18
285/15
2012/0318229 A1  12/2012 Obenaus

FOREIGN PATENT DOCUMENTS

| DE | 10359054 A1 | 7/2005 | |
|---|---|---|---|
| DE | 102007048929 A1 * | 4/2009 | ......... F01N 13/1827 |
| EP | 2110529 A1 | 10/2009 | |
| FR | 2449840 A1 | 9/1980 | |
| WO | 2011113793 A1 | 9/2011 | |

OTHER PUBLICATIONS

European Search Report for EP19156058, dated Apr. 25, 2019.

* cited by examiner

*Primary Examiner* — Kevin A Lathers
(74) *Attorney, Agent, or Firm* — McGarry Bair PC

(57) ABSTRACT

A turbo housing manifold includes a base plate defining a first opening and a housing conduit portion connected with the base plate and defining a second opening distal from the first opening. The housing conduit can include a first extending portion proximate to the base plate and extending axially away from the base plate, and a second extending portion connected with the first extending portion and distal from the base plate wherein an inner surface of the second extending portion transitions as the second extending portion extends away from the base plate.

17 Claims, 2 Drawing Sheets

TURBO HOUSING ELEMENT

CROSS REFERENCE TO RELATED APPLICATIONS

This application claims the benefit of U.S. Provisional Application Ser. No. 62/630,205 filed Feb. 13, 2018, which is incorporated herein by reference in its entirety.

BACKGROUND OF THE INVENTION

A turbocharger, or a "turbo", is a turbine-driven forced induction device that increases an internal combustion engine's efficiency and power output by forcing extra air into the combustion chamber. Extra air is forced into the combustion chamber by utilizing a compressor to compress intake air and fuel into the combustion chamber at a pressure or pressures greater than atmospheric pressure alone. In some instances, the compressor can be rotationally driven by a set of turbine blades exposed to a post-combustion exhaust conduit.

BRIEF DESCRIPTION

In one aspect, the present disclosure relates to a turbo housing manifold, including a planar base plate defining a first opening and a housing conduit portion connected with the base plate and defining a second opening distal from the first opening and axially aligned with the first opening, the housing conduit portion defining an inner surface. The housing conduit portion further includes a first extending portion proximate to the base plate and extending axially away from the base plate, and a second spherical extending portion connected with the first extending portion and distal from the base plate. An inner surface of the second spherical extending portion transitions from a larger radius to a smaller radius as the second spherical extending portion extends away from the base plate.

DESCRIPTION OF EMBODIMENTS OF THE INVENTION

Figure 1:
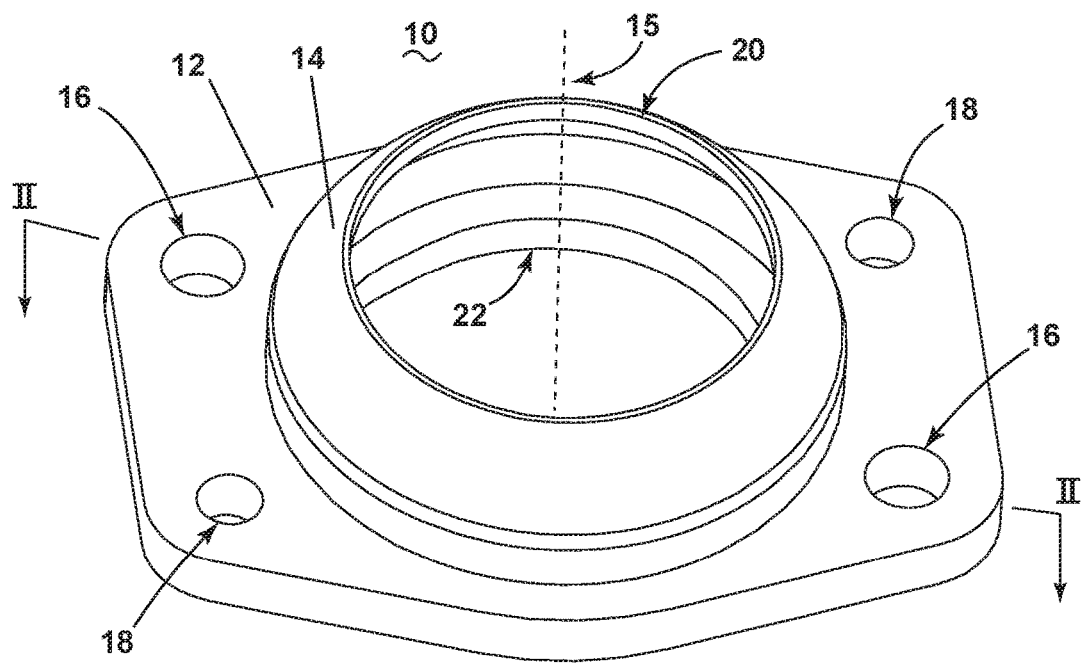
FIG. 1 illustrates an isometric view of a turbo housing element in accordance with various aspects described herein.

While the description is described with respect to a turbo housing, a turbo housing manifold, and the like, aspects of the disclosure can be implemented in any environment, apparatus, or method for providing, receiving, or otherwise utilizing a fluid flow in a serial relationship between a manifold or upstream fluid source or housing and a downstream fluid flow conduit. As used herein, "downstream" refers to a relative position of a referential component, element, or the like, in the direction of a flow, such as a fluid or air flow. Likewise, as used herein, "upstream" refers to a relative position of a referential component, element, or the like, in the opposite or opposing direction of a flow, such as a fluid or air flow.

Also as used here, a flow "intake" and flow "exhaust" may denote relative receiving or expelling locations for a flow in a component or element. Aspects of an "intake" can include any opening, aperture, conduit, or the like, receiving a fluid flow, and is not limited to a primary intake, an opening exposed to the environment, or the like. Similarly, aspects of an "exhaust" can include any opening, aperture, conduit, or the like, expelling a fluid flow, and is not limited to only aspects exhausting a flow to an environment. Stated another way, any element or component that receives a flow and expels a flow can include an intake and an exhaust. Additionally multiple components arranged serially can each include respect intakes and exhausts, such that, for example, the exhaust of the upstream component can be fluidly connected with the intake of the downstream component.

While "a set of" various elements will be described, it will be understood that "a set" can include any number of the respective elements, including only one element. As used herein, the terms "axial" or "axially" refer to a dimension along a longitudinal axis of a component or referential description or along a longitudinal axis of a component. As used herein, the terms "radial" or "radially" refer to a dimension extending between a center longitudinal axis of a component or referential description, an outer circumference, or a circular or annular component disposed relative to a component or referential description. The use of the terms "proximal" or "proximally," either by themselves or in conjunction with the terms "radial" or "radially," refers to moving in a direction toward the center longitudinal axis, or a component being relatively closer to the center longitudinal axis as compared to another component.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, welded, joined, etc.) are to be construed broadly and can include intermediate members between a collection of elements and relative movement between elements unless otherwise indicated. As such, connection references do not necessarily infer that two elements are directly connected and in fixed relation to each other.

The exemplary drawings are for purposes of illustration only and the dimensions, positions, order and relative sizes reflected in the drawings attached hereto can vary.

As illustrated in FIG. 1, turbo housing element 10 is shown having at first housing portion, shown as a plate 12 having an first opening 22 or aperture defining a longitudinal axis 15, and a second housing portion, shown as a spherical conduit 14 arranged about the plate 12 and longitudinal axis 15. As used herein, a "spherical conduit" can include any conduit having at least a spherical portion, including a semi-spherical portions, a hemi-spherical portions, or the like. In one non-limiting instance, the plate 12 can be further shaped, contoured, formed, or otherwise comprising a generally planar base plate 12 having a set of secondary through openings, shown as a first set of through openings 16 and a second set of through openings 18. In another non-limiting example, the plate 12 can have at least a partially geometric configuration when viewed axially along the longitudinal axis 15, such as a generally rectangular or hexagonal shape or perimeter. In another non-limiting aspect of the disclosure, the first opening 22 can be centrally arranged through the plate 12. In one non-limiting example, the plate 12 can measure 8 millimeters thick, that is, in the axial direction. In another non-limiting example, the plate 12 can include fewer or additional through openings 16, 18, such as only two or dual openings. In yet another non-limiting example, the plate 12 can include a generally rhombic shape or perimeter.

As shown, aspects of the disclosure can be included wherein the first and second sets of through openings 16, 18 are sized similarly or dissimilarly. In one example, the smaller of the first or second sets of through openings 16, 18 can be threaded to accept a mechanical fastener. For example, as shown, the first set of through openings 16 can include a larger through opening radius, compared with the through opening radius of the second set of through openings 18. Also as shown, the first and second through openings 16, 18 can be arranged such that, for example, at least one of the first or second sets of through openings 16, 18 are at opposing edges, sides, corners, or opposite of the first opening 22 or longitudinal axis 15.

The spherical conduit 14 can include a second opening 20 or aperture coaxial with the longitudinal axis 15, the first opening 22, or a combination thereof. In one non-limiting example, a plane defined by second opening 20 or rim of the second opening can be parallel with the plate 12. As shown, at least a portion of the spherical conduit 14 can be connected with the plate 12 and extends normally away from the plate 12 in the axial direction of the longitudinal axis 15. In non-limiting instances, at least one of the first opening 22 or second opening 20 can include a generally circular aperture, however, non-circular, ovate, or other geometric apertures can be included for one or both openings 22, 20.

Figure 2:
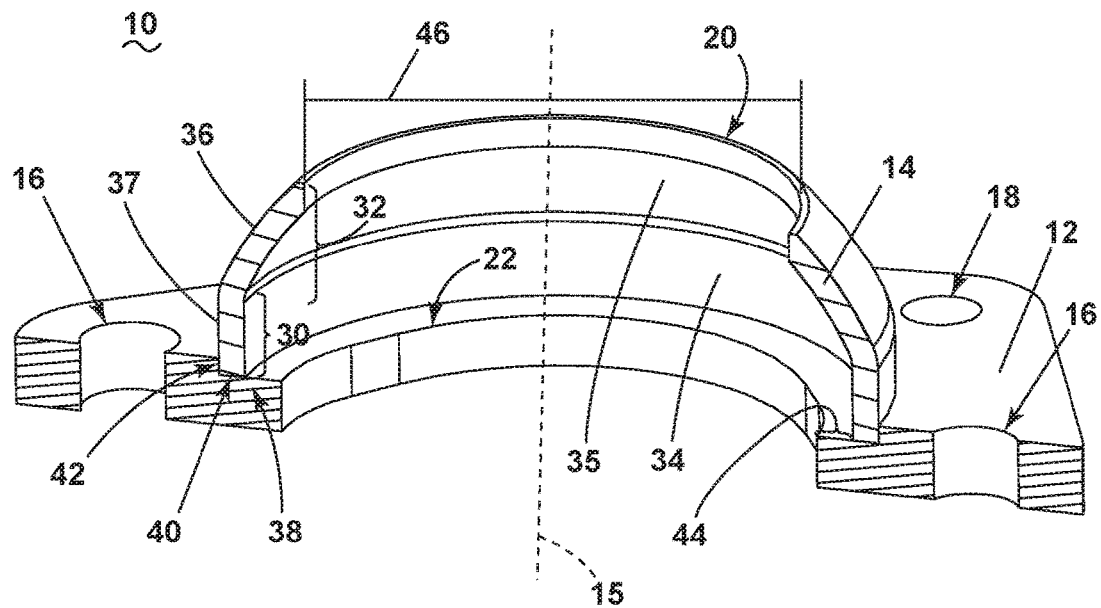
FIG. 2 illustrates a cross-sectional view of the turbo housing element, taken along line II-II of FIG. 1, in accordance with various aspects described herein.

FIG. 2 illustrates a cross-sectional view of the turbo housing element 10, taken along line II-II of FIG. 1. As better shown in FIG. 2, the spherical conduit 14 can include a vertically extending portion 30 defined by a first conduit wall having an exterior or outer surface 37 and an interior or inner surface 34, and extending substantially normally away from the plate 12, that is, parallel with the longitudinal axis 15. The vertically extending portion 30 can transition to a spherical extending portion 32 of the spherical conduit 14, having an exterior or outer surface 36 and an interior or inner surface 35. The spherical extending portion 32 can terminate at an axial end distal from the plate 12 at the second opening 20. In one non-limiting example of the illustrated second opening 20, the diameter length 46 of the second opening 20 can measure 57 millimeters across (28.5 millimeter radius). In another non-limiting example, the second opening 20 can define a radial area of 2552 millimeters squared.

As used herein, a "transition" can denote any change from a first configuration, geometric shaping, or the like, to a second, different configuration, geometric shaping, or the like. In non-limiting aspects, the transition can be gradual over a length extending in the axial direction, abrupt (e.g. a sharp or angled transition) or a combination thereof, including, for instance, a multi-tiered stepped set of transitions. As shown, the transition between the vertically extending portion 30 and through the spherical extending portion 32 can include a reducing radial dimension of the spherical extending portion 32 as the portion 32 extends away from the plate 12. Stated another way, the distal end (with reference to the plate 12 or the vertically extending portion 30) of the spherical extending portion 32 has a smaller radial dimension compared with the proximal end of the spherical extending portion 32. As such, at least one of the inner surface 35 or the outer surface 36 can define a radially slanted or sloped surface.

In this example, the spherical extending portion 32 is more distal from the plate 12, compared with the vertically extending portion 30. Non-limiting aspects of the disclosure can include the spherical conduit 14 having a uniform wall thickness. For instances, vertically extending portion 30 and the spherical extending portion 32 can have a uniform thickness measured between the respective inner and outer surfaces 34, 35, 36, 37, as the spherical conduit 14 extends away from the plate 12. In one non-limiting example, the uniform thickness can measure 3 millimeters.

The spherical conduit 14 can be received by the plate 12 at an interface 38 or a "seat." In one non-limiting example, the interface 38 can include a set of walls set within the plate 12 and size, shaped, contoured, or the like, to receive a spherical conduit 14 end. For instance, the plate 12 can define a first axial interface edge 40 (e.g. the edge 40 extending in a radial direction at an axial point, relative to the longitudinal axis 15) sized, shaped, or the like, to axially abut an end of the spherical conduit 14. In the non-limiting illustrated example, the first axial interface edge 40 can be substantially planar and normal to the longitudinal axis 15. In another non-limiting instance, the plate 12 can define a second radial interface edge 42 (e.g. the edge 42 extending in an axial direction at a radial point, relative to the longitudinal axis 15) sized, shaped, or the like, to radially abut an outer surface of the spherical conduit 14 proximate to the plate 12. Non-limiting examples of the outer surface of the spherical conduit 14 can include, but are not limited to, the outer surfaces 36, 37 described herein.

In another non-limiting instance, the interface 38 can include an overhanging portion 44 of the plate 12, relative to the radial dimension of the spherical conduit 14, such as the radial dimension of the vertically extending portion 30 of the conduit 14. In the illustrated example, the first opening 22 can be defined by the inner radial dimension of the overhanging portion 44. As shown, the overhanging portion 44 can extend or overhang inward, that is, toward the longitudinal axis 15, beyond the inner surface 34 of the vertically extending portion 30.

In another non-limiting example, the overhanging portion 44 can have an inner radial dimension or flow area greater than the diameter length 46 of the second opening 20. In this sense, the overhanging portion 44 will not be a substantial limit or hindrance to fluid flow traversing the turbo housing element 10 in the axial direction. In one non-limiting instance, the first opening 22 can have a flow area of 2812 millimeters squared and opening 20 a smaller flow area of 2552 square millimeters limited by the inner diameter of the connected conduit 60. In non-limiting instances, the plate and the spherical conduit 14 can be connected, coupled, or mechanically attached to one another at the interface 38. For instance, the interface 38 can include a mechanical fastener, adhesive, welding (such as laser welding, for instance), or the like. The interface connecting or coupling can occur, for example, at the first axial edge 40, the second radial interface edge 42, or another proximate position.

Figure 3:
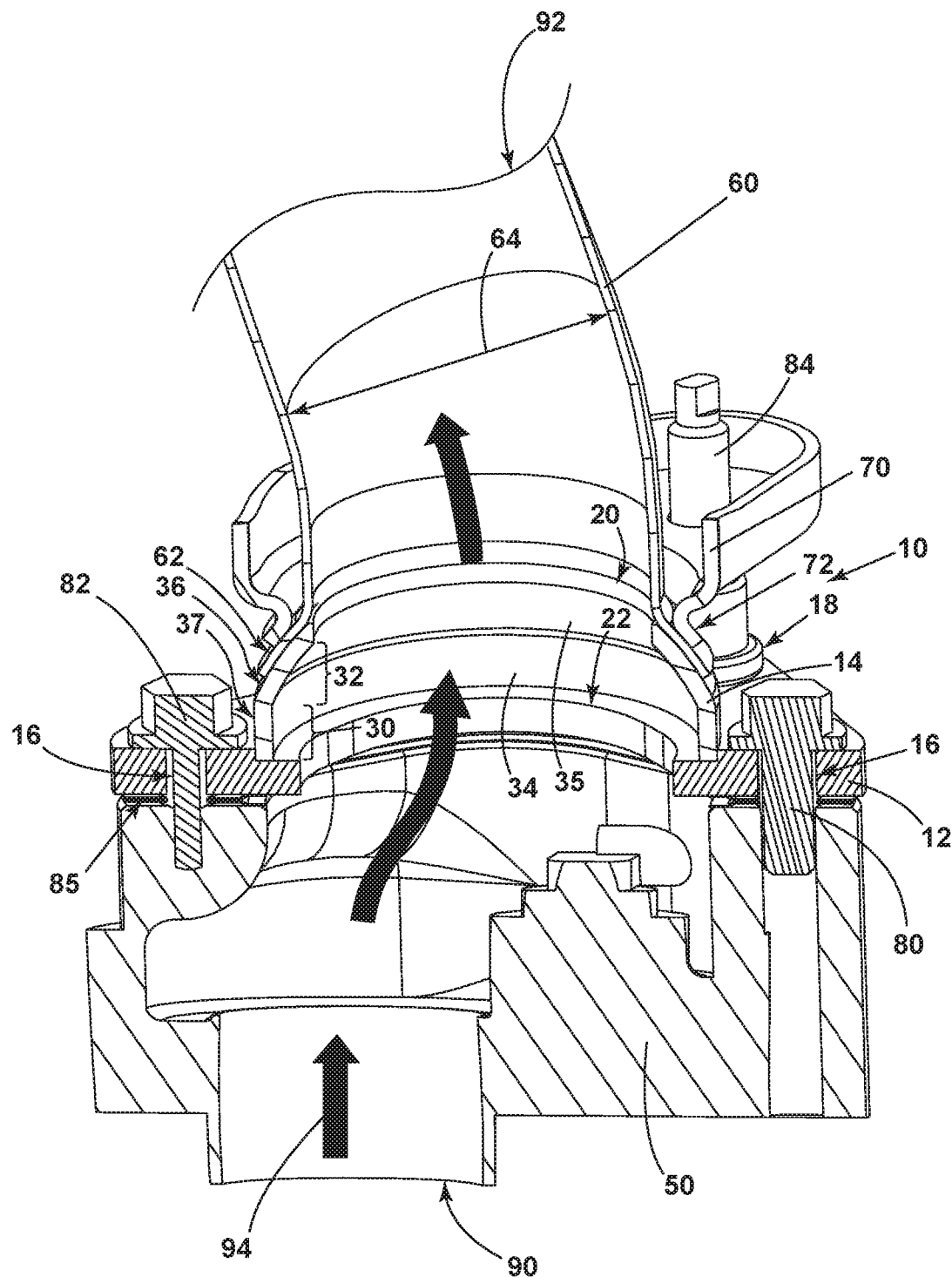
FIG. 3 illustrates an example assembly of the turbo housing element mounted in-line with a turbo exhaust manifold, in accordance with various aspects described herein.

FIG. 3 illustrates an example configuration of the turbo housing element 10 assembled relative to a turbo housing flow. As shown, the turbo housing element 10 can be connected, coupled, mechanically attached, or the like, with an upstream turbo housing 50 by way of mechanical fasteners, shown as screws 80, 82, at the first or second set of through openings 16, 18. The upstream turbo housing 50 can also include an upstream fluid inlet 90 is receives a fluid flow from a flow source. In the illustrated example, the upstream turbo housing 50 can be connected or positioned proximate to the plate 12. In one non-limiting example, a sealing element 85 can be positioned between the turbo housing element 10 and the upstream turbo housing 50 to fluidly seal the fluid flow.

The turbo housing element 10 can be further connected, coupled, mechanically attached, or the like with a downstream turbo conduit 60 having a downstream fluid outlet 92 that delivers, provides, or connects to otherwise supply a fluid flow to a flow destination. As shown, the downstream turbo conduit 60 can include a flared end 62 adapted to overlay the outer surface 36 of the spherical extending portion 32. In one non-limiting example, the downstream turbo conduit 60, or the inner radius downstream of the flared end 62 can define a diameter length 64 matching, related to, corresponding with, or otherwise in a relationship with the diameter length 46 of the second opening 20. While a diameter length 64 is shown, non-limiting aspects of the disclosure can be included wherein dimensions of the downstream turbo conduit 60 can match, relate to, correspond with, or the like, to a respective dimension of the second opening (e.g. radial dimension, area dimension, etc.).

As shown, the downstream turbo conduit 60 or the flared end 62 can be fixed relative to the turbo housing element 10, the spherical extending portion 32, or the like, by a form-flange 70 having a flared end 72 to overlies at least one of the flared end 62 of the downstream turbo conduit 60, the outer surface 36 of the spherical extending portion 32, or a combination thereof. The form-flange 70 can be axially fixed, relative to the longitudinal axis of the turbo housing element 10 (not shown) by, for example, a mechanical fastener, shown as a bolt 84. In another non-limiting example the bolt 84 can be formed with or incorporated into aspects of the aforementioned mechanical fasteners or screws 80, 82 connecting one or more of the turbo housing element 10, the upstream turbo housing 50, the downstream turbo conduit 60, the form-flange 70, or a combination thereof. In the non-limiting example wherein the turbo housing element 10 includes only a limited number of bolts, the plate 12 can be connected or attached to the turbo housing 50 by way of mechanical components, such as studs 84, passing through at least a subset of openings 16, 18 into the threaded holes in the turbo housing 50.

During operation, a fluid flow 94, such as a gaseous flow, is received at the upstream fluid inlet 90 of the upstream turbo housing 50. The fluid flow 94 axially traverses the turbo housing element 10, downstream of the upstream turbo housing 50, by passing serially through the first opening 22 or aperture, followed by the second opening 20 or aperture. The fluid flow 94 then flows downstream through the downstream turbo conduit 60 to the downstream fluid outlet 92.

The adaptation or configuration of the aforementioned components, including, but not limited to, the overhanging portion 44, the vertically extending portion 30, the spherical extending portion 32, the first opening 22, the second opening 20, a relative dimension thereof, or a combination there of, can reduce the back-pressure of the fluid flow 94 traversing the turbo housing element 10. In another non-limiting example, the transition of the inner surface 34 of the vertically extending portion 30 to the radially slanted or sloped inward inner surface 35 of the spherical extending portion 32 can further reduce the back-pressure of the fluid flow 94 traversing the turbo housing element 10. In yet another non-limiting example, matching the dimensioning of at least one of the first or second openings 22, 20 relative to the dimensioning of the downstream turbo conduit 60 can further reduce the back-pressure of the fluid flow 94 traversing the turbo housing element 10.

In one non-limiting example, fluid flow through the turbo housing element 10 exhibits a 30% reduction in back-pressure compared to the same flow through a conventional one-piece turbo flange.

Many other possible aspects and configurations in addition to that shown in the above figures are contemplated by the present disclosure. To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbo housing manifold, comprising:
   a planar base plate comprising a radially-extending overhang defining a first opening; and
   a housing conduit portion connected with the base plate and defining a second opening distal from the first opening and axially aligned with the first opening to form a fluid passage between the first opening and the second opening, the housing conduit portion defining an inner surface, the housing conduit portion further including:
      a first extending portion proximate to the base plate and extending axially away from the base plate; and
      a second spherical extending portion connected with the first extending portion and distal from the base plate;
   wherein an inner surface of the second spherical extending portion transitions from a larger radius to a smaller radius as the second spherical extending portion extends away from the base plate;
   wherein the overhang extends radially into the fluid passage beyond the first extending portion of the housing conduit portion.

2. The turbo housing manifold of claim 1 wherein the second opening is smaller than the first opening.

3. The turbo housing manifold of claim 1 wherein the second opening is in a serially downstream flow relationship with the first opening, and wherein the second opening defines a flow area of 2552 millimeters squared.

4. The turbo housing manifold of claim 3 wherein the first opening defines a flow area of 2812 millimeters squared.

5. The turbo housing manifold of claim 1 wherein the first opening and the second opening are coaxial.

6. The turbo housing manifold of claim 1 wherein the first extending portion is a cylindrical portion.

7. The turbo housing manifold of claim 1 wherein the second spherical extending portion is at least one of a semi-spherical portion or a hemi-spherical portion.

8. The turbo housing manifold of claim 1 wherein the housing conduit portion defines a sidewall having a uniform thickness through the first extending portion and the second spherical extending portion.

9. The turbo housing manifold of claim 1 wherein the first opening and second opening are annular.

10. The turbo housing manifold of claim 1 wherein the transition of the inner surface of the second spherical extending portion defines a radially slanted inner surface.

11. The turbo housing manifold of claim 1 wherein the planar base plate further defines a seat configured to receive the housing conduit portion.

12. The turbo housing manifold of claim 11 wherein the seat is defined by at least a first axial interface edge and a second radial interface edge, relative to an axis defined by the first opening.

13. The turbo housing manifold of claim 11 wherein the seat defines the overhang.

14. The turbo housing manifold of claim 1 wherein the planar base plate defines a hexagonal perimeter.

15. The turbo housing manifold of claim 1 wherein the first opening is centrally arranged relative to the base plate.

16. A turbocharger assembly, comprising:
   an upstream turbo housing having a fluid inlet and a hollow passage fluidly coupled to the fluid inlet; and
   a turbo housing manifold coupled to the upstream turbo housing to define a flow passage through the hollow passage and the turbo housing manifold, the turbo housing manifold further comprising:
      a planar base plate comprising a radially-extending overhang defining a first opening fluidly coupled to the fluid inlet; and
      a housing conduit portion connected with the base plate and defining a second opening, the housing conduit portion further including:
         a first extending portion proximate to the base plate and extending axially away from the base plate; and
         a second spherical extending portion connected with the first extending portion and distal from the base plate;
      wherein an inner surface of the second spherical extending portion transitions from a larger radius to a smaller radius as the second spherical extending portion extends away from the base plate; and
      wherein the overhang extends radially into the flow passage beyond the first extending portion.

17. The turbo housing assembly of claim 16 wherein the overhang defines a seat of the planar base plate configured to receive the housing conduit portion.

* * * * *